United States Patent
Chakkirala

(10) Patent No.: US 10,224,802 B1
(45) Date of Patent: Mar. 5, 2019

(54) METHODS FOR EXTENDING HOLDUP TIMES AND/OR REDUCING BULK CAPACITORS IN MULTI-STAGE SWITCHING POWER SUPPLIES

(71) Applicant: Astec International Limited, Kowloon (HK)

(72) Inventor: Sudhakarababu Chakkirala, Pasig (PH)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 15/997,439

(22) Filed: Jun. 4, 2018

(51) Int. Cl.
| | |
|---|---|
| *H02M 3/335* | (2006.01) |
| *H02M 1/08* | (2006.01) |
| *H02M 3/155* | (2006.01) |
| *H02M 1/00* | (2006.01) |
| *H02M 1/42* | (2007.01) |

(52) U.S. Cl.
CPC .............. *H02M 1/08* (2013.01); *H02M 3/155* (2013.01); *H02M 3/33569* (2013.01); *H02M 1/4208* (2013.01); *H02M 2001/007* (2013.01)

(58) Field of Classification Search
CPC ... H02M 3/155; H02M 3/335; H02M 3/33569
See application file for complete search history.

(56) References Cited

U.S. PATENT DOCUMENTS

| 2011/0134670 A1* | 6/2011 | Colbeck .............. H02M 1/4225 363/124 |
| 2014/0160799 A1* | 6/2014 | Gu ........................ H02M 3/156 363/17 |

* cited by examiner

*Primary Examiner* — Timothy J. Dole
*Assistant Examiner* — Ishrat Jamali
(74) *Attorney, Agent, or Firm* — Harness, Dickey & Pierce, P.L.C.

(57) ABSTRACT

A multi-stage switching power supply includes a first DC-DC power converter, a second DC-DC power converter and a control circuit. The control circuit is coupled to the DC-DC power converters for providing a first control signal to the first DC-DC power converter and a second control signal to the second DC-DC power converter. The control circuit is configured to vary a duty cycle of the first control signal to regulate an output voltage of the power supply, maintain a frequency of the second control signal at a fixed frequency, and in response to the duty cycle of the first control signal reaching a duty cycle threshold or an input voltage of the first DC-DC power converter reaching a voltage threshold, vary a frequency of the second control signal to regulate the output voltage of the power supply. Other example power supplies, control circuits, etc. are also disclosed.

23 Claims, 7 Drawing Sheets

METHODS FOR EXTENDING HOLDUP TIMES AND/OR REDUCING BULK CAPACITORS IN MULTI-STAGE SWITCHING POWER SUPPLIES

FIELD

The present disclosure relates to methods for extending a holdup time in power supplies.

BACKGROUND

This section provides background information related to the present disclosure which is not necessarily prior art.

Switched mode power supplies are commonly used for power management in distributed power systems. The power supplies each may include multiple power stages having a resonant power stage operated at a fixed resonant frequency with unity gain. For example, a two stage power supply may include a AC-DC power factor correction (PFC) power stage and a resonant power stage coupled to the output of the AC-DC PFC power stage for output voltage regulation, and a three stage power supply may include a AC-DC PFC power stage, a resonant power stage and a DC-DC power stage coupled between the AC-DC PFC power stage and the resonant power stage for output voltage regulation.

SUMMARY

This section provides a general summary of the disclosure, and is not a comprehensive disclosure of its full scope or all of its features.

According to one aspect of the present disclosure, a multi-stage switching power supply includes an input, an output for providing an output voltage to a load, at least two power converters coupled between the input and the output, and a control circuit. The at least two power converters include a first DC-DC power converter having at least one power switch and a second DC-DC power converter having at least one power switch. The second DC-DC power converter is a resonant power converter. The control circuit is coupled to the at least two DC-DC power converters for providing a first control signal to the power switch of the first DC-DC power converter and a second control signal to the power switch of the second DC-DC resonant power converter. The control circuit is configured to vary a duty cycle of the first control signal to regulate the output voltage of the power supply, maintain a frequency of the second control signal at a fixed frequency, and in response to the duty cycle of the first control signal reaching a defined duty cycle threshold or an input voltage of the first DC-DC power converter reaching a defined voltage threshold, vary a frequency of the second control signal to regulate the output voltage of the power supply.

According to another aspect of the present disclosure, a method for regulating an output voltage of a multi-stage switching power supply is disclosed. The multi-stage switching power supply includes at least two power converters having a first DC-DC power converter and a second DC-DC power converter. The second DC-DC power converter is a resonant power converter. The method includes varying a duty cycle of a first control signal provided to at least one power switch of the first DC-DC power converter and maintaining a fixed frequency of a second control signal provided to at least one power switch of the second DC-DC power converter to regulate the output voltage of the multi-stage switching power supply, and in response to the duty cycle of the first control signal reaching a defined duty cycle threshold or an input voltage of the first DC-DC power converter reaching a defined voltage threshold, varying a frequency of a second control signal provided to at least one power switch of the second DC-DC resonant power converter to regulate the output voltage of the multi-stage switching power supply.

According to another aspect of the present disclosure, a control circuit for regulating an output voltage of a multi-stage switching power supply is disclosed. The multi-stage switching power supply includes an input, an output for providing an output voltage to a load, and at least two power converters coupled between the input and the output. The at least two power converters includes a first DC-DC power converter having at least one power switch and a second DC-DC power converter having at least one power switch. The second DC-DC power converter is a resonant power converter. The control circuit is configured to couple to the at least two DC-DC power converters for providing a first control signal to the power switch of the first DC-DC power converter and a second control signal to the power switch of the second DC-DC resonant power converter, vary a duty cycle of the first control signal to regulate the output voltage of the power supply, maintain a frequency of the second control signal at a fixed frequency, and in response to the duty cycle of the first control signal reaching a defined duty cycle threshold or a voltage received by the first DC-DC power converter reaching a defined voltage threshold, vary a frequency of the second control signal to regulate the output voltage.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts and/or features throughout the several views of the drawings.

DETAILED DESCRIPTION

Figure 1:
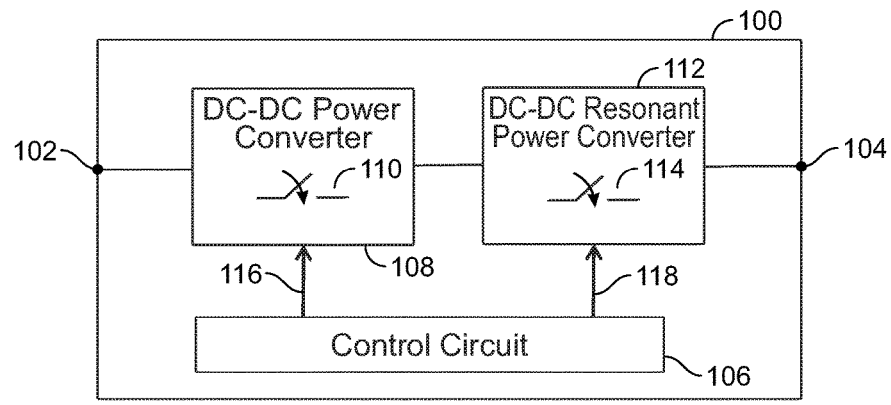
FIG. 1 is a block diagram of a switched mode power supply including a resonant power converter and a control circuit for altering control of the resonant power converter between fixed frequency control and variable frequency control, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A multi-stage switching power supply according to one example embodiment of the present disclosure is illustrated in FIG. 1 and indicated generally by reference number 100. As shown in FIG. 1, the power supply 100 includes an input 102, an output 104 for providing an output voltage to a load (not shown), two power converters coupled between the input 102 and the output 104, and a control circuit 106. The power converters include a DC-DC power converter 108 having at least one power switch 110 and a DC-DC resonant power converter 112 having at least one power switch 114. The control circuit 106 is coupled to the DC-DC power converters 108, 112 for providing a control signal 116 to the power switch 110 of the DC-DC power converter 108 and a control signal 118 to the power switch 114 of the DC-DC resonant power converter 112. The control circuit 106 is configured to vary a duty cycle of the control signal 116 to regulate the output voltage of the power supply 100, maintain a frequency of the control signal 118 at a fixed frequency, and in response to the duty cycle of the control signal 116 reaching a defined duty cycle threshold or a voltage received by the DC-DC power converter 108 reaching a defined voltage threshold, vary a frequency of the control signal 118 to regulate the output voltage of the power supply 100.

By varying the duty cycle of the power switch 110 of the DC-DC power converter 108 and then varying the switching frequency of the power switch 114 of the DC-DC resonant power converter 112, a holdup time of the power supply 100 (and other switched mode power supplies disclosed herein) may be extended as compared to conventional power supplies having resonant power converters with fixed frequency control. For example, power provided to the input 102 of the power supply, an input of the DC-DC power converter 108, etc. may be removed. In such examples, the voltage at the output 104 begins to decrease. If the output voltage falls below a desired output regulation range, the power supply 100 may shut down to protect the load. This time in which the power supply 100 remains within the output regulation range after the input power is removed is referred to as the holdup time.

The control circuit 106 may operate in multiple modes for regulating the output voltage of the switched mode power supply 100. For example, the control circuit 106 may operate in a normal mode in which the DC-DC power converter 108 provides voltage regulation for the power supply 100. This mode of operation may continue after the input power provided to the power supply 100, the DC-DC power converter 108, etc. is lost (e.g., during a holdup period). When the control circuit 106 determines the output voltage of the power supply 100 is inadequate, the control circuit 106 may operate in an extended holdup time mode in which the DC-DC power converter 112 provides voltage regulation for the power supply 100.

The control circuit 106 may monitor one or more power supply parameters to determine whether it should operate in its normal mode or extended holdup time mode. For example, the control circuit 106 may determine whether it should operate in the normal mode or extended holdup time mode based on saturation of the control signal 116. For instance, the control circuit 106 may monitor the varying duty cycle of the control signal 116. When the duty cycle reaches the duty cycle threshold, the control circuit 106 may switch operation from its normal mode to its extended holdup time mode.

In other examples, the control circuit 106 may monitor the input voltage of the DC-DC power converter 108 to determine whether it should operate in its normal mode or extended holdup time mode. For example, the control circuit 106 may compare the input voltage of the DC-DC power converter 108 to a defined voltage threshold. If the input voltage reaches (e.g., decreases to) the voltage threshold, the control circuit 106 may switch operation from its normal mode to its extended holdup time mode. In some examples, the defined voltage threshold may be a value based on the transfer gain of the DC-DC resonant power converter 112 and the maximum duty cycle of the DC-DC power converter 108.

During the normal mode operation, the DC-DC power converter 108 is controlled in a voltage control mode and the DC-DC power converter 112 is controlled in an open-loop mode with fixed frequency operation. In such examples, the control circuit 106 regulates an output voltage of the power converter 108 by varying the duty cycle of the control signal 116 provided to the power switch 110. For example, the control circuit 106 may vary the duty cycle of the control signal 116 between a minimum duty cycle and a maximum duty cycle (e.g. the duty cycle threshold). In some examples, the minimum duty cycle may be 50%, 75%, etc., and the maximum duty cycle may be 90%, 95%, 97%, etc.

As shown in FIG. 1, the DC-DC resonant power converter 112 is coupled to receive the regulated output voltage of the power converter 108. As such, the resonant power converter 112 may be designed to receive a fixed input voltage. In such examples, the resonant power converter 112 may be operated at a fixed switching frequency equal to the converter's resonant frequency during normal mode operation. As such, the resonant power converter 112 may be operated at a fixed switching frequency when the input voltage of the DC-DC power converter 108 is less than the defined voltage threshold, when the duty cycle of the control signal 116 is less than the defined duty cycle threshold, etc.

When the resonant power converter 112 is operated at its resonant frequency, the converter 112 has a transfer gain of one. In such cases, the output voltage of the power converter 112 remains substantially equal to its input voltage (e.g., the regulated output voltage of the power converter 108) due to the transfer gain value of one. Accordingly, the output voltage of the power supply 100 is substantially equal to the regulated output voltage of the power converter 108 during the normal mode operation.

In some cases, the input power provided to the power supply 100, the DC-DC power converter 108, etc. may be lost. As a result, the output voltage of the power converter 108 (and the power supply 100) begins to decrease during this holdup period. Once this decrease in voltage is sensed, the control circuit 106 begins to increase the duty cycle of the control signal 116 to maintain the output voltage of the power converter 108 (and the power supply 100) within the output regulation range. If necessary, the duty cycle of the control signal 116 may be increased to (and sometimes maintained at) the maximum duty cycle. If the input power is not restored, the DC-DC power converter 108 may be unable to regulate its output voltage once the duty cycle reaches its maximum value, and as a result, the output voltage of the power supply 100 may continue to decrease.

At this point, the control circuit 106 switches operation from the normal mode to the extended holdup time mode. During the extended holdup time mode, the DC-DC power converter 108 may be controlled in an open loop mode with fixed duty cycle control (e.g., a current control mode) and the DC-DC power converter 112 provides voltage regulation for the power supply 100 by varying the switching frequency. For example, once the duty cycle reaches the duty cycle threshold (e.g., the maximum duty cycle) or the input voltage of the power converter 108 reaches the voltage threshold as explained above, the control circuit 106 begins to vary the frequency of the control signal 118 provided to the resonant power converter 112 to regulate its output voltage (and the output voltage of the power supply 100).

In some examples, the frequency of the control signal 118 may be varied within a defined range. For example, the varying frequency may decrease from the power converter's resonant frequency to a lower frequency. In such examples, as the frequency of the control signal 118 decreases from the resonant frequency, the transfer gain of the power converter 112 increases to values above one. As a result of the increased transfer gain, the power converter 112 is able to regulate and maintain its output voltage (and therefore the output voltage of the power supply 100) within the output regulation range for a period of time even though the input voltage of the power converter 112 may be decreasing. Thus, by altering control of the power converter 112 from fixed frequency control to variable frequency control, the output voltage of the power supply 100 may remain within the output regulation range for a longer period of time than conventional methods of only fixed frequency control.

In some examples, the input power may be restored and the control circuit 106 may switch back to operating in its normal mode if desired. In other examples, the output voltage of the power supply 100 may continue to decrease to a value outside the output regulation range. In such cases, the power supply 100 is disabled to protect the load.

As shown in FIG. 1, the DC-DC power converter 108 is coupled between the input 102 of the power supply 100 and the DC-DC resonant power converter 112, and the DC-DC resonant power converter 112 is coupled between the DC- DC power converter 108 and the output 104. As such, and as explained above, the DC-DC power converter 108 provides an output (e.g., sometimes a regulated output voltage) to the DC-DC power converter 112, and the DC-DC resonant power converter 112 provides an output (e.g., sometimes a regulated output voltage) to the power supply output 104.

Figure 9:
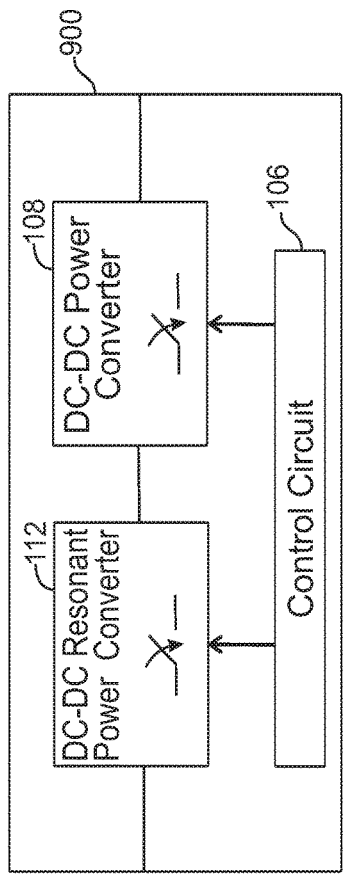
FIG. 9 is a block diagram of a switched mode power supply including a resonant power converter and a DC-DC power converter coupled to an output of the resonant power converter according to yet another example embodiment.

Alternatively, in some embodiments the resonant power converter 112 of FIG. 1 may be coupled between the input 102 and the power converter 108, and the power converter 108 may be coupled between the resonant power converter 112 and the output 104. For example, FIG. 9 illustrates a multi-stage switching power supply 900 including the DC-DC resonant power converter 112, the DC-DC power converter 108 and the control circuit 106 of FIG. 1, in which the power converter 108 is coupled to an output of the resonant power converter 112. The power converters 108, 112 may be operated in a similar manner as explained above relative to FIG. 1.

Figure 2:
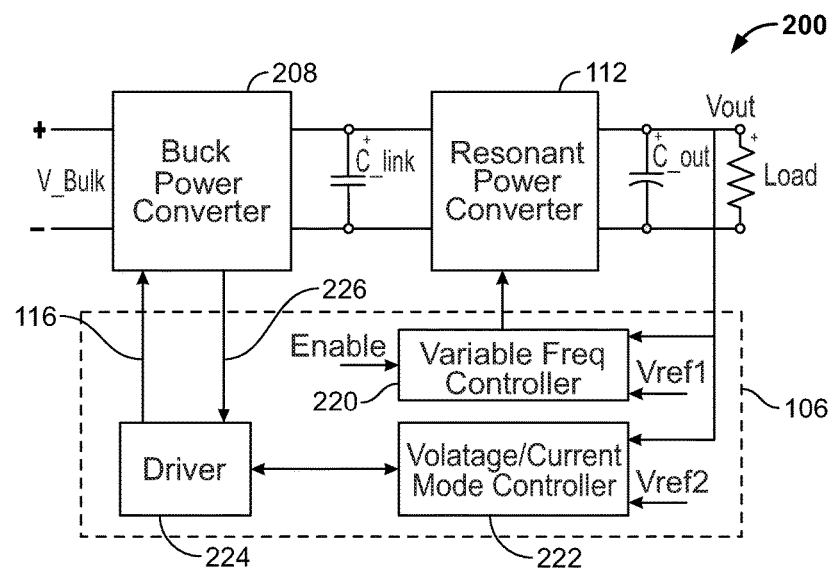
FIG. 2 is a block diagram of a multi-stage switching power supply including a buck power converter and the resonant power converter of FIG. 1, according to another example embodiment.

Referring back to FIG. 1, the DC-DC power converter 108 may include any suitable topology such as a buck, boost, buck-boost, etc. topology. In some embodiments, the topology of the DC-DC power converter 108 may be selected based on the topology of the DC-DC resonant power converter 112, the resonant converter's operating point, etc. For example, FIG. 2 illustrates a multi-stage switching power supply 200 including a buck power converter 208, and the DC-DC resonant power converter 112 and the control circuit 106 of FIG. 1. As shown in FIG. 2, the resonant power converter 112 is coupled to a load (represented by a resistor).

In the example of FIG. 2, the control circuit 106 includes a variable frequency controller 220, a voltage/current mode controller 222 and a driver 224. The voltage/current mode controller 222 determines if the buck power converter 208 is operated in its voltage control mode (e.g., voltage regulation) or its current control mode. For example, the buck power converter 208 is operated in the voltage control mode to regulate its output voltage across a linking capacitor C_link coupled between the buck power converter 208 and the resonant power converter 112. This is accomplished by varying the duty cycle of the control signal 116 generated by the driver 224, as explained above. For example, the duty cycle of the control signal 116 may be varied based on a comparison between a sensed output voltage Vout of the power supply 200 and a reference voltage Vref2 as shown in FIG. 2, a sensed current 226 flowing through the buck converter's inductor (not shown), etc. If the duty cycle reaches a maximum duty cycle of the buck power converter 208, the buck power converter 208 may be operated in its current control mode to provide an unregulated output to the resonant power converter 112.

The variable frequency controller 220 is enabled in response to the duty cycle of the control signal 116 reaching a duty cycle threshold or an input voltage (e.g., the voltage V_Bulk) of the DC-DC power converter 208 reaching a voltage threshold. The variable frequency controller 220 varies the frequency of the control signal 118, as explained above. For example, the frequency of the control signal 118 may be varied based on a comparison between the sensed output voltage Vout of the power supply 200 and a reference voltage Vref1 as shown in FIG. 2 to regulate the output voltage Vout of the power supply 200.

The DC-DC resonant power converter 112 of FIGS. 1 and 2 (and/or the other resonant power converters disclosed herein) may include any suitable topology such as a series resonant converter (e.g., an LLC series resonant converter, etc.), a forced resonant converter, etc. The LLC series resonant converters may include, for example, an LLC series resonant half-bridge converter, an LLC series resonant full-bridge converter, etc. In some embodiments, the resonant power converters may include a single rail power converter. In other embodiments, the resonant power converters may include an interleaved power converter Additionally, although FIGS. 1 and 2 illustrate the power supplies 100, 200 as including two DC-DC power stages, it should be apparent that either power supply 100, 200 may include additional power stages. In such examples, the power supplies 100, 200 may include another power stage such as AC-DC power converter coupled on the input side of the power converters 108, 208.

Figure 3:
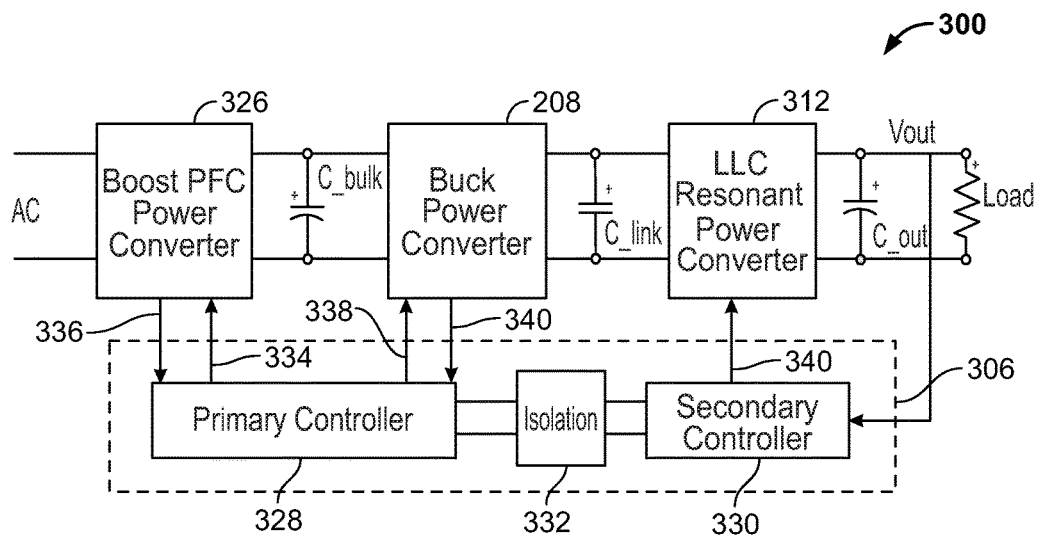
FIG. 3 is a block diagram of a multi-stage switching power supply including an AC-DC boost PFC power converter, the buck power converter of FIG. 2 and an LLC resonant power converter, according to yet another example embodiment.

For example, FIG. 3 illustrates an AC-DC multi-stage switching power supply 300 including the DC/DC buck power converter 208 of FIG. 2, an LLC half-bridge resonant power converter 312 and an AC-DC power converter 326 coupled between an input of the power supply 300 and the buck power converter 208. As shown in FIG. 3, the buck power converter 208 is coupled to the AC-DC power converter 326 via a bulk capacitor C_bulk and to the LLC resonant power converter 312 via a linking capacitor C_link. The LLC resonant power converter 312 is coupled to a load (represented by a resistor). In the example embodiment of FIG. 3, the AC-DC power converter 326 includes a boost PFC topology. Alternatively, the AC-DC power converter 326 may include another AC-DC topology if desired.

In some embodiments, the AC-DC power supply 300 may include a power isolation component in one of the power converters. For example, the LLC resonant power converter 312 may include a transformer. In such examples, a magnetizing inductance of the transformer may form a portion of LLC resonant tank circuit.

The power supply 300 also includes a control circuit 306 for controlling one or more power switches (not shown) in the power converters 208, 312, 326. As shown in FIG. 3, the control circuit 306 includes a primary side controller 328, a secondary side controller 330, and an isolation component 332 coupled between the primary side controller 328 and the secondary side controller 330. The isolation component 332 may include, for example, an optocoupler, a transformer, etc.

The primary side controller 328 controls one or more power switches in the AC-DC power converter 326. For example, the primary side controller 328 may generate one or more control signals 334 for controlling the power switches of the AC-DC power converter 326 for correcting a power factor. The control signals 334 may be generated based on a sensed parameter 336 (e.g., an AC input current, an AC input voltage and/or a DC bulk voltage) of the AC-DC power converter 326, the power supply 300, etc.

Additionally, the primary side controller 328 controls one or more power switches in the buck power converter 208. For example, the primary side controller 328 may generate one or more control signals 338 having a varying duty cycle to regulate the output voltage Vout of the power supply 300, as explained above. This duty cycle variation may be based on the sensed output voltage Vout of the power supply 300, a sensed current 340 flowing through the buck converter's inductor (not shown), etc. In such examples, the duty cycle may vary between a minimum duty cycle and a maximum duty cycle.

As shown in FIG. 3, the secondary side controller 330 controls switches in the LLC resonant power converter 312. For example, the secondary side controller 330 may generate one or more control signals 340 for controlling one or more power switches (e.g., MOSFETs) and/or one or more synchronous rectifiers (e.g., MOSFETs). In such examples, the control signals 340 for controlling the power switches may have a fixed or variable frequency. For instance, the switching frequency of the power switches may be fixed at times and variable in response to the duty cycle of the control signals 338 reaching a duty cycle threshold (e.g., the maximum duty cycle) or the voltage across the bulk capacitor C_bulk reaching a voltage threshold.

In some examples, the LLC resonant power converter 312 may be controlled independent of the buck power converter 208. In such examples, the secondary side controller 330 may employ a closed loop control scheme for controlling the switches in the resonant power converter 312. In other examples, the secondary side controller 330 may change the resonant power converter's switching frequency variation based on a sensed instantaneous bulk voltage level across the bulk capacitor C_bulk after the duty cycle of the control signals 338 reaches the duty cycle threshold.

Figure 4:
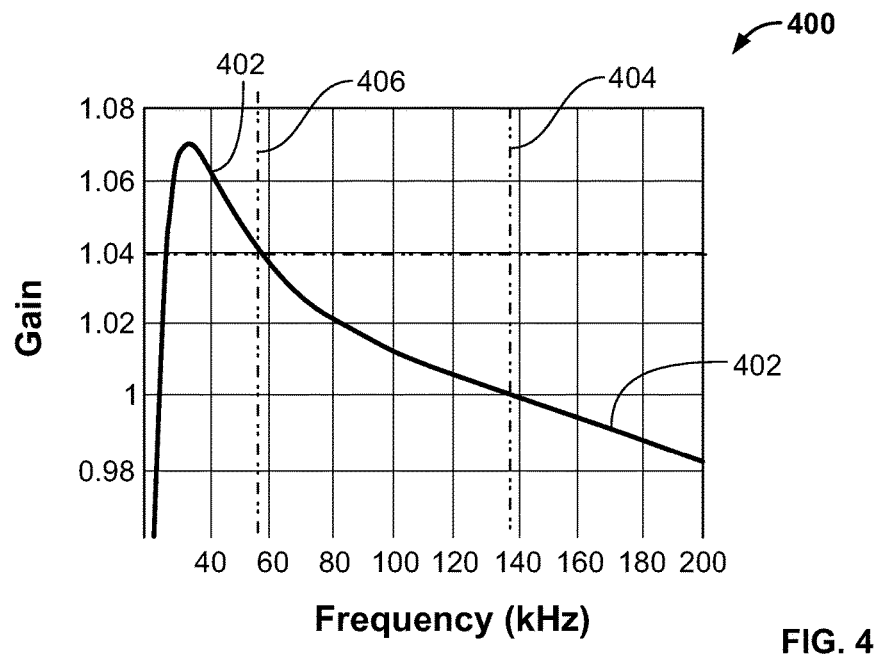
FIG. 4 is a graph illustrating a frequency response of the LLC resonant power converter of FIG. 3 according to another example embodiment.

The output voltage Vout of the power supply 300 is regulated by the buck power converter 208 and by the LLC resonant power converter 312. For example, when the buck power converter 208 is able to regulate its output voltage (the voltage across linking capacitor C_link), the switching frequency of the resonant power converter 312 is fixed at a resonant frequency. During this time, the transfer gain of the resonant power converter 312 is one. For example, FIG. 4 illustrates a graph 400 of a frequency response for the resonant power converter 312. As shown, when the frequency (represented by the line 402) of the power converter 312 is fixed at the resonant frequency of 137 kHz (represented by the line 404), the converter 312 has a transfer gain equal to one. As a result, the resonant power converter 312 does not alter the regulated output voltage of the buck power converter 208.

When the output voltage of the buck power converter 208 decreases causing the output voltage Vout to decrease outside an output regulation range, control of the resonant power converter 312 is altered from fixed frequency control to variable frequency control. For example, the switching frequency of the power converter 312 may vary between the resonant frequency and a frequency less than the resonant frequency. During this time, the transfer gain of the resonant power converter 312 increases to a value greater than one.

For instance, and as shown in FIG. 4, when the frequency (the line 402) of the power converter 312 is allowed to vary to a value less than the resonant frequency (e.g., about 58 kHz represented by the line 406), the converter 312 has a transfer gain equal to about 1.04. As a result, the output voltage of the power converter 312 is increased by a factor of 1.04 relative to its input voltage (e.g., the output voltage of the buck power converter 208) when the switching frequency drops to about 58 kHz. The switching frequency of the power converter 312 may continue to decrease (and therefore increase its transfer gain) to regulate the output voltage of the power converter 312 (and the output voltage Vout of the power supply 300). This frequency reduction may continue until the switching frequency reaches a minimum threshold value. In some examples, the switching frequency may be clamped at the minimum threshold value.

For exemplary purposes only, the power supply 300 may be a 3000 W/12V AC-DC power supply in which the LLC half-bridge resonant power converter 312 and the buck power converter 208 have a combined efficiency of 98%. In such examples, the resonant power converter 312 may be designed to have an input voltage of 312 V, 318.5 V, etc., and the LLC resonant tank circuit may include a magnetizing inductance of 130 pH, a resonant inductance of 2.5 pH, and a resonant capacitor of 540 nF. The buck power converter 208 may be designed to have an input voltage of 335.3 V with a maximum duty cycle of 0.95.

Figure 5:
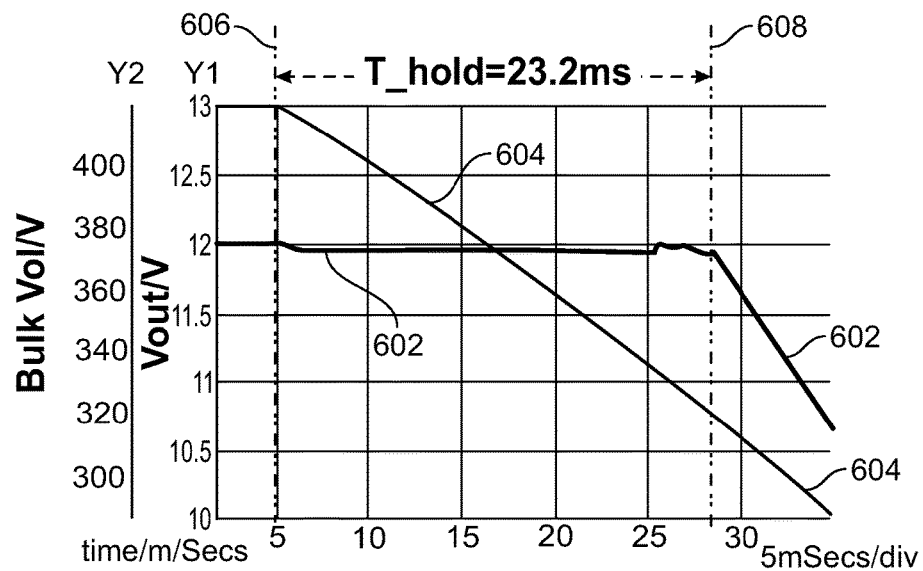
FIG. 5 is a graph illustrating an output DC voltage and a bulk DC voltage of the power supply of FIG. 3 according to yet another example embodiment.
Figure 6:
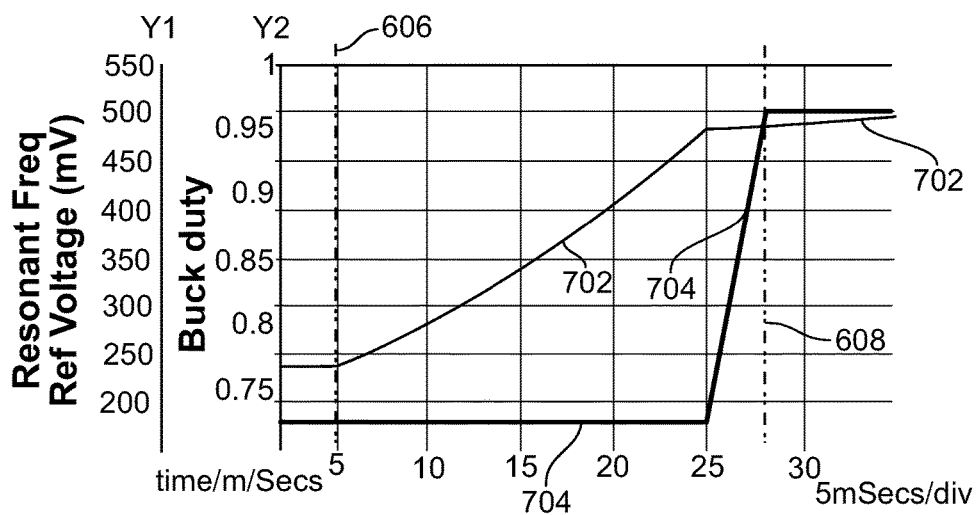
FIG. 6 is a graph illustrating a duty cycle of a control signal for the buck power converter of FIG. 3 and a frequency reference voltage for the resonant power converter of FIG. 3 when the resonant power converter switches between fixed frequency control and variable frequency control according to another example embodiment.
Figure 7:
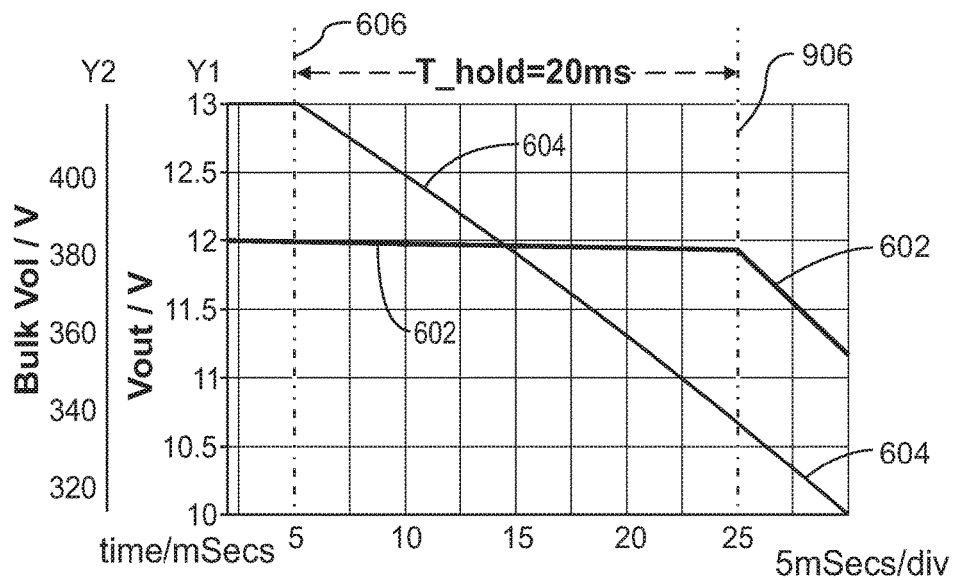
FIG. 7 is a graph illustrating an output DC voltage and a bulk DC voltage of the power supply of FIG. 3 when the resonant power converter remains in fixed frequency control according to yet another example embodiment.
Figure 8:
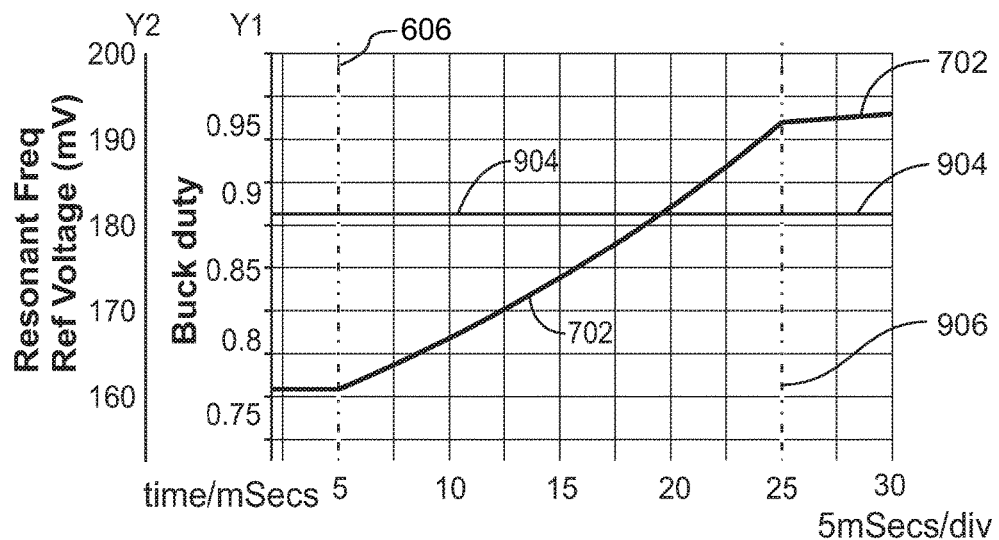
FIG. 8 is a graph illustrating a duty cycle of a control signal for the buck power converter of FIG. 3 and a frequency reference voltage for the LLC resonant power converter of FIG. 3 when the resonant power converter remains in fixed frequency control according to another example embodiment.

As shown in FIGS. 5-8, the output voltage Vout (represented by the line 602) of the power supply 300 is regulated at 12 V and the bulk voltage (represented by the line 604) across the bulk capacitor C_bulk is 420 V during normal operation. When the AC input is lost at about the 5 msec mark (represented by the line 606), the bulk voltage begins to decrease linearly. As shown in FIGS. 6 and 8, after the AC input is lost, the duty cycle (represented by the line 702) of the buck power converter 208 increases to the maximum duty cycle (e.g., the duty cycle threshold) to maintain the output voltage Vout at about 12 V.

Once the duty cycle reaches the maximum duty cycle at about the 25 msec mark, the control circuit 306 alters control of the resonant power converter 312 from fixed frequency control to variable frequency control, as explained above. This altering frequency control is shown by the frequency reference voltage (the line 704 of FIG. 6) switching from a constant value during fixed frequency control to increasing values (relative to time) during variable frequency control. As a result of this frequency control, the output voltage Vout is maintained at 12 V until about the 28.2 msec mark (the line 608 of FIGS. 5 and 6). At this point, the output voltage Vout is outside the output regulation range. In this example, the holdup time of the power supply 300 is 23.2 msec, as shown in FIG. 5.

In contrast, conventional systems employed fixed frequency control throughout operation as shown by the constant frequency reference voltage (represented by line 904 in FIG. 8). As a result, the output voltage Vout is maintained at 12 V until the duty cycle of the buck power converter 208 reaches the maximum duty cycle at the 25 msec mark (represented by the line 906), as shown in FIGS. 7 and 8. This equates to a holdup time of 20 msec. Thus, in this particular example, the holdup time is increased by about 3.2 msec by altering the frequency control of the resonant power converter 312 from fixed frequency control to variable frequency control, as explained above.

Figure 10:
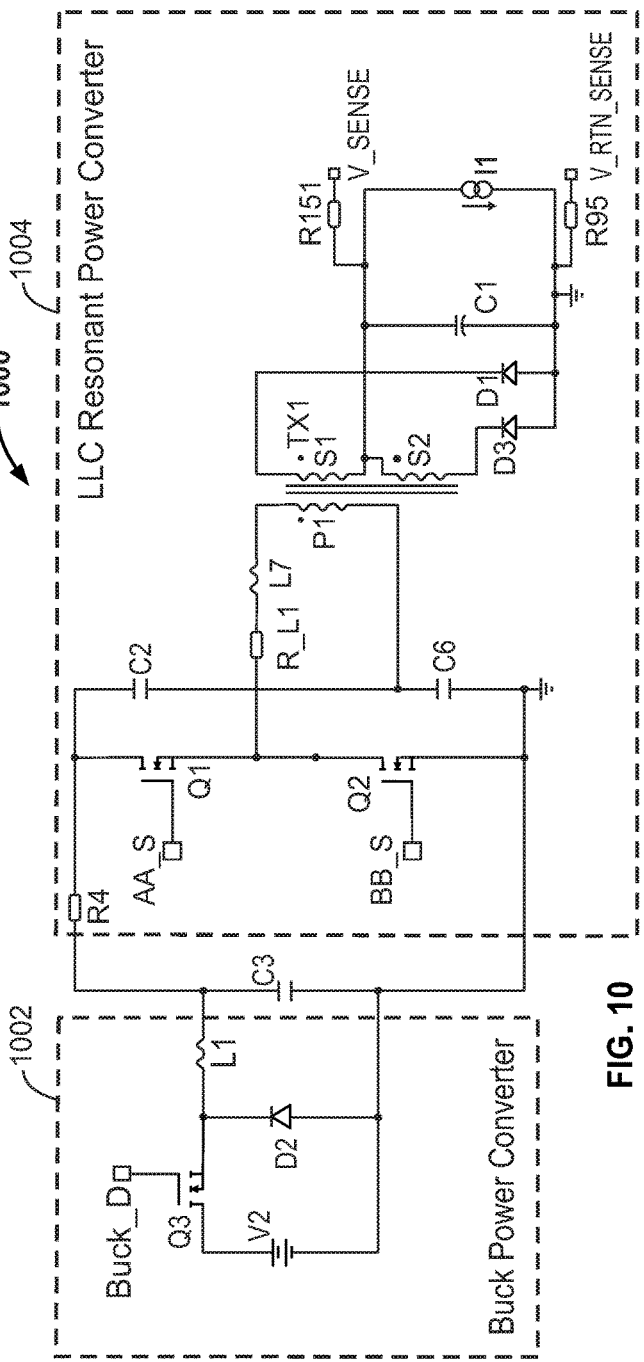
FIG. 10 is a circuit schematic of a multi-stage switching power supply including a buck power converter and an LLC half-bridge resonant power converter, according to another example embodiment.

FIG. 10 illustrates a multi-stage switching power supply 1000 including a buck power converter 1002, an LLC series resonant half-bridge converter 1004 and a link capacitor C3 coupled between the power converters 1002, 1004. As shown in FIG. 10, the buck power converter 1002 includes a power switch Q3, an inductor L1, and a diode D2 coupled between the power switch Q3 and the inductor L1.

The LLC resonant half-bridge power converter 1004 includes two power switches Q1, Q2, two capacitors C2, C6, a transformer TX1, an inductor L7 coupled to a primary side of the transformer TX1, a resistor R_L1 coupled between the inductor L7 and the power switches Q1, Q2, and rectifying circuit coupled to a secondary side of the transformer TX1. The resistor R_L1 represents the equivalent series resistance (ESR) of the inductor L1. The capacitors C2, C6, the inductor L7 and a magnetizing inductance of the transformer TX1 form the LLC resonant tank.

As shown in FIG. 10, three controls signals drive the power switches Q1, Q2, Q3. Specifically, a PWM control signal Buck_D having a varying duty cycle drives the power switch Q3, a control signal AA_S drives the power switch Q1, and a control signal BB_S drives the power switch Q2.

Figure 11:
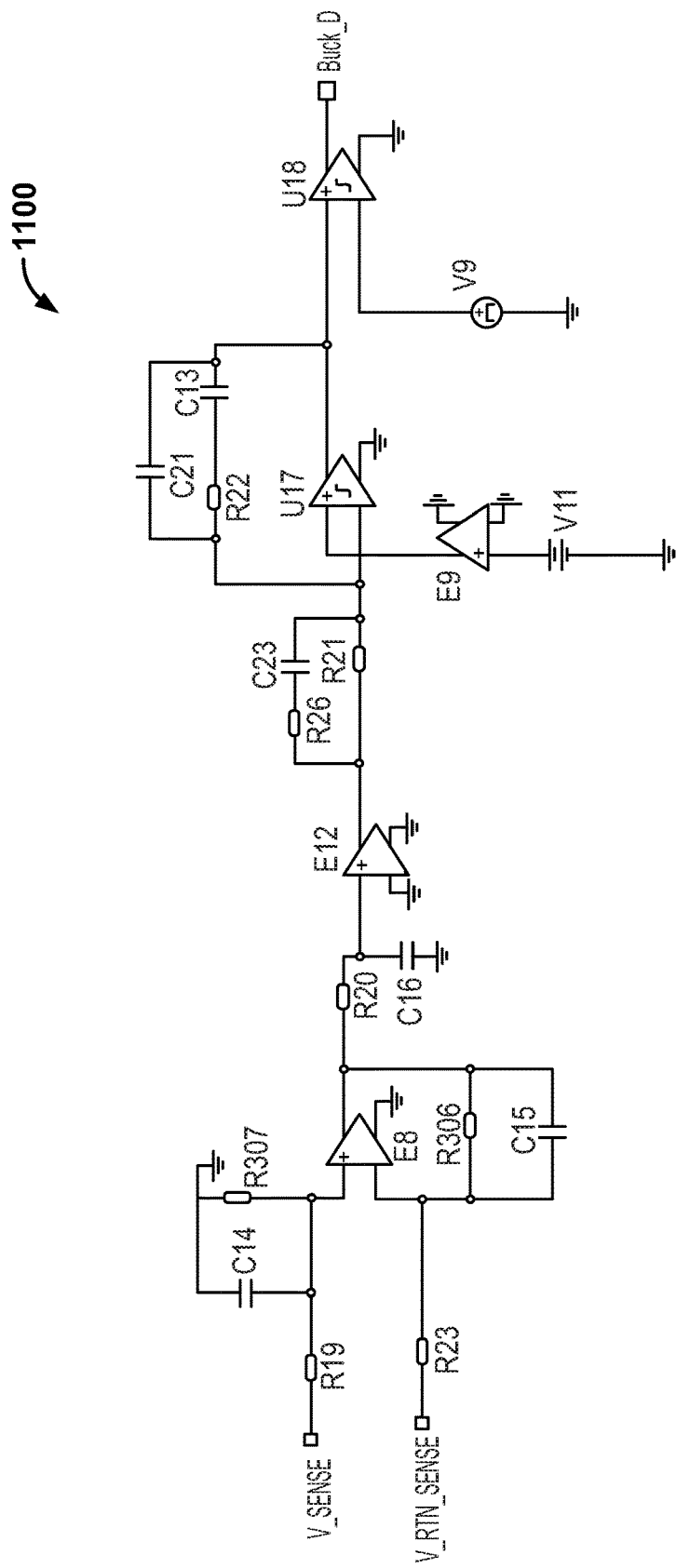
FIG. 11 is a circuit schematic of a control circuit for controlling a power switch in the buck power converter of FIG. 10, according to yet another example embodiment.
Figure 12:
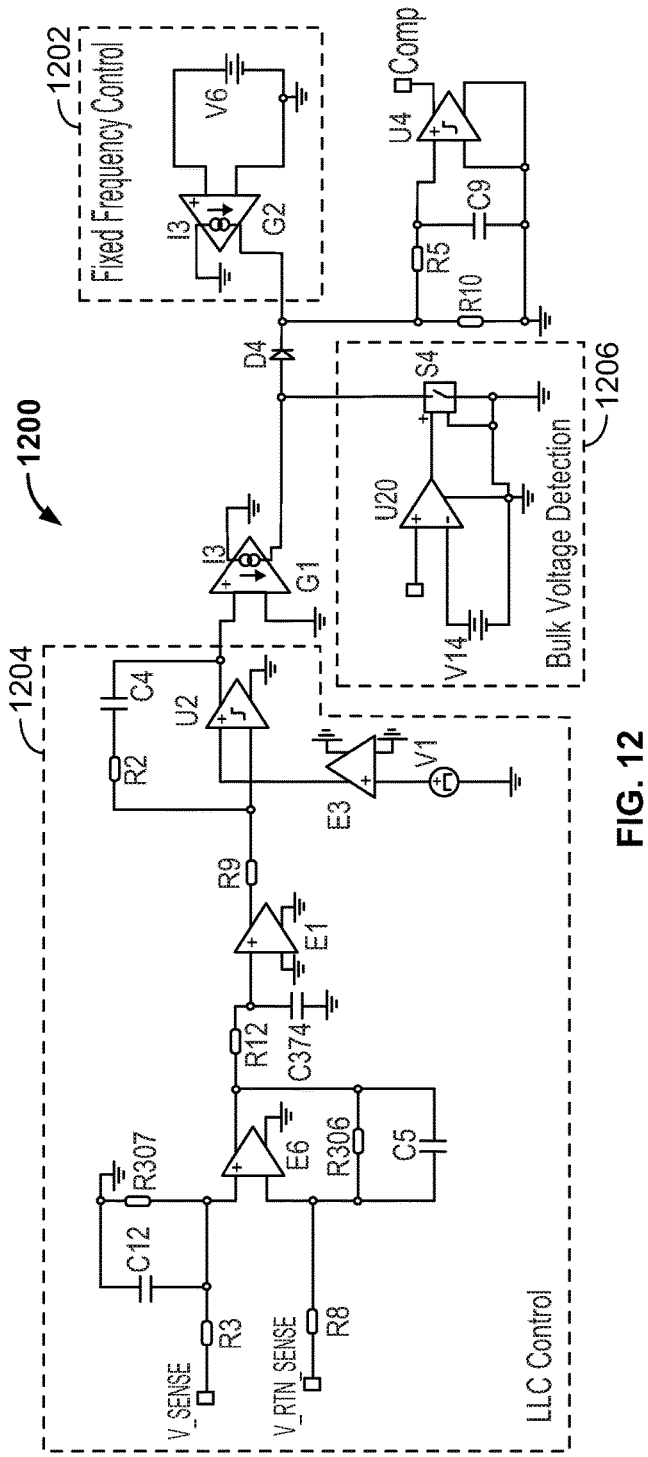
FIG. 12 is a circuit schematic of a control circuit including a bulk voltage detection circuit for enabling a variable frequency controller or a fixed frequency controller for controlling power switches in the LLC half-bridge resonant power converter of FIG. 10, according to another example embodiment.
Figure 13:
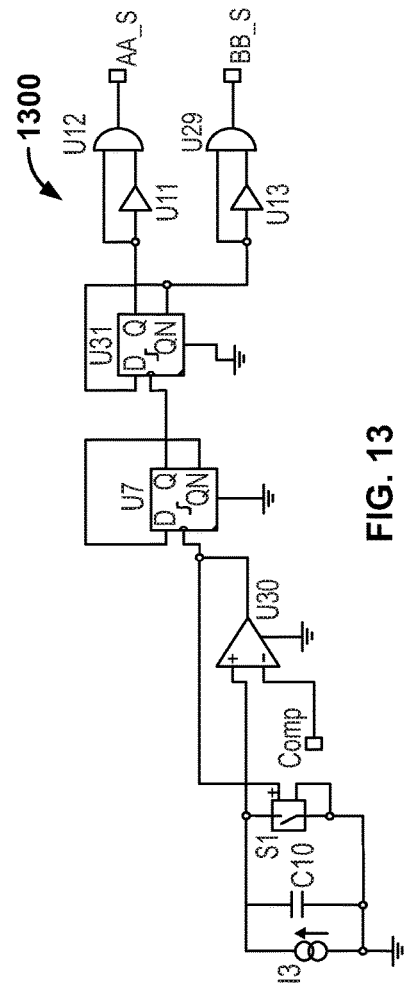
FIG. 13 is a circuit schematic of a control circuit for controlling power switches in the LLC half-bridge resonant power converter of FIG. 10, according to yet another example embodiment.

FIGS. 11-13 illustrate control circuits 1100, 1200, 1300 for controlling the power switches Q1, Q2, Q3 in the power converters 1002, 1004 of FIG. 10. The control circuits 1100, 1200, 1300 may be a portion of a system control circuit for the power supply 1000.

The control circuit 1100 is used during the buck converter's voltage control mode. For example, and as shown in FIGS. 10 and 11, the power supply 1000 includes sense resistors R95, R151 for sensing an output voltage of the power supply 1000 (e.g., signals V_Sense, V_RTN_Sense). The sensed output voltage is passed through various components (e.g., capacitors, resistors, amplifiers, etc.), and provided to an amplifier U17. The amplifier U17 compares the sensed output voltage and a reference voltage V11, and outputs a signal having an appropriate duty cycle for regulating the output voltage. This signal is provided to a comparator U18. The comparator U18 compares the output signal from the amplifier U17 to a sawtooth wave reference signal V9 to generate the PWM control signal Buck_D.

The control circuits 1200 and 1300 of FIGS. 12 and 13 are used to control the power switches Q1, Q2 of the LLC resonant power converter 1004. For example, the control circuit 1200 includes a fixed frequency controller 1202 for controlling the power switches Q1, Q2 at a fixed frequency, a LLC controller 1204 for controlling the power switches Q1, Q2 at a variable frequency and a bulk voltage detection circuit 1206 for determining which controller 1202, 1204 is enabled. For instance, the bulk voltage detection circuit 1206 includes a comparator U20 for comparing a bulk voltage (e.g., the voltage V2 of the power supply 1000) and a reference voltage V14. When the bulk voltage is greater than the reference voltage V14, the fixed frequency controller 1202 is enabled and the LLC resonant power converter 1004 is operated at a fixed frequency. When the bulk voltage is less than the reference voltage V14, the LLC controller 1204 is enabled and the LLC resonant power converter 1004 is operated at a variable frequency. In other embodiments, the duty cycle of the control signal Buck_D may be used to determine which controller 1202, 1204 is used to control the power switches Q1, Q2.

As shown in FIGS. 12 and 13, the fixed frequency controller 1202 includes a reference voltage V6 and the control circuit 1300 includes a comparator U30. The comparator U30 compares the reference voltage V6 to a signal (comp) to generate the complimentary control signals AA_S, BB_S (as shown in FIG. 13) when the fixed frequency controller 1202 is enabled, When the LLC controller 1204 is enabled, the sensed output voltage is passed through various components (e.g., capacitors, resistors, amplifiers, etc.), and provided to an amplifier U2. The amplifier U2 compares the sensed output voltage to a reference voltage V1 to generate a reference signal having a varying frequency. The reference signal from the amplifier U2 is passed to an amplifier U4 for generating the signal (comp) and is provided to the comparator U30 in the control circuit 1300 of FIG. 13. The comparator U30 compares the reference signal to the signal (comp) to generate the complimentary control signals AA_S, BB_S (as shown in FIG. 13) when the LLC controller 1204 is enabled.

The control circuits disclosed herein may include an analog control circuit, a digital control circuit (e.g., a digital signal controller (DSC), a digital signal processor (DSP), etc.), or a hybrid control circuit (e.g., a digital control unit and an analog circuit). Additionally, the entire control circuit, some of the control circuit, or none of the control circuit may be positioned on an integrated circuit. Further, any one of the control circuits may be a portion of another control circuit (e.g., a portion of the power supply's control circuit), or may be a distinct control circuit.

The power supplies disclosed herein may be employed in any suitable application. For example, any one of the power supplies may be used in server application, a telecommunication application, etc. In some examples, the power supplies may be considered distributed power systems.

By altering the frequency control of a resonant power converter from fixed frequency control to variable frequency control after an input is removed, lost, etc., the holdup time of a power supply including the resonant power converter may be extended as compared to other conventional systems. In such examples, the holdup time is extended without affecting the efficiency of the resonant power converter. For example, resonant tank components in the resonant power converter may be designed and optimized based on a fixed input voltage to achieve soft switching.

In some embodiments, the holdup time of the power supply may be further improved. For example, resonant tank components may be designed to provide a higher transfer gain when the switching frequency of the resonant power converter decreases. As a result, the output voltage of the power supply may be maintained for a longer period of time and the holdup time may be extended.

Additionally, by altering the frequency control, the size of a bulk capacitor coupled between power converters may be reduced as compared to conventional systems. For example, testing has shown that a 12.5% reduction in bulk capacitance may be achieved as compared to conventional systems. As such, costs associated with the power supply may be reduced and a power density of the power supply may be improved compared conventional systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A multi-stage switching power supply comprising:
an input;
an output for providing an output voltage to a load;
at least two power converters coupled between the input and the output, the at least two power converters including a first DC-DC power converter having at least one power switch and a second DC-DC power converter having at least one power switch, wherein the second DC-DC power converter is a resonant power converter; and
a control circuit coupled to the at least two DC-DC power converters for providing a first control signal to the power switch of the first DC-DC power converter and a second control signal to the power switch of the second DC-DC power converter, the control circuit configured to vary a duty cycle of the first control signal to regulate the output voltage of the power supply, maintain a frequency of the second control signal at a fixed frequency, and in response to the duty cycle of the first control signal reaching a defined duty cycle threshold or an input voltage of the first DC-DC power converter reaching a defined voltage threshold, vary the frequency of the second control signal to regulate the output voltage of the power supply.

2. The multi-stage switching power supply of claim 1 wherein the first DC-DC power converter is coupled between the input and the second DC-DC power converter.

3. The multi-stage switching power supply of claim 1 further an AC-DC power converter coupled between the input and the first DC-DC power converter.

4. The multi-stage switching power supply of claim 1 wherein the control circuit is configured to vary the duty cycle of the first control signal between the defined duty cycle threshold and a duty cycle lower than the defined duty cycle threshold.

5. The multi-stage switching power supply of claim 1 wherein the control circuit is configured to vary the frequency of the second control signal from a first defined frequency to a second defined frequency lower than the first defined frequency.

6. The multi-stage switching power supply of claim 1 wherein the control circuit is configured to vary the frequency of the second control signal in response to the duty cycle of the first control signal reaching the defined duty cycle threshold.

7. The multi-stage switching power supply of claim 1 wherein the control circuit is configured to maintain the duty cycle at the defined duty cycle threshold when the frequency of the second control signal is varied.

8. The multi-stage switching power supply of claim 1 wherein the control circuit is configured to vary the frequency of the second control signal in response to the input voltage of the first DC-DC power converter reaching the defined voltage threshold.

9. A method for regulating an output voltage of a multi-stage switching power supply, the multi-stage switching power supply including at least two power converters having a first DC-DC power converter and a second DC-DC power converter, wherein the second DC-DC power converter is a resonant power converter, the method comprising:
varying a duty cycle of a first control signal provided to at least one power switch of the first DC-DC power converter and maintaining a fixed frequency of a second control signal provided to at least one power switch of the second DC-DC power converter to regulate the output voltage of the multi-stage switching power supply; and
in response to the duty cycle of the first control signal reaching a defined duty cycle threshold or an input voltage of the first DC-DC power converter reaching a defined voltage threshold, varying a frequency of a second control signal provided to at least one power switch of the second DC-DC power converter to regulate the output voltage of the multi-stage switching power supply.

10. The method of claim 9 wherein varying the duty cycle of the first control signal includes varying the duty cycle of the first control signal between the defined duty cycle threshold and a duty cycle lower than the defined duty cycle threshold.

11. The method of claim 9 wherein varying the frequency of the second control signal includes varying the frequency of the second control signal from a first defined frequency to a second defined frequency lower than the first defined frequency.

12. The method of claim 9 wherein varying the frequency of the second control signal includes varying the frequency of the second control signal in response to the duty cycle of the first control signal reaching the defined duty cycle threshold.

13. The method of claim 9 wherein varying the frequency of the second control signal includes varying the frequency of the second control signal in response to the input voltage of the first DC-DC power converter reaching the defined voltage threshold.

14. The method of claim 9 wherein maintaining a fixed frequency of the second control signal includes maintaining a fixed frequency of the second control signal when the duty cycle of the first control signal is less than the defined duty cycle threshold or the voltage received by the first DC-DC power converter is less than the defined voltage threshold.

15. A control circuit for regulating an output voltage of a multi-stage switching power supply, the multi-stage switching power supply including an input, an output for providing an output voltage to a load, and at least two power converters coupled between the input and the output, the at least two power converters including a first DC-DC power converter having at least one power switch and a second DC-DC power converter having at least one power switch, wherein the second DC-DC power converter is a resonant power converter, and wherein the control circuit is configured to couple to the at least two DC-DC power converters for providing a first control signal to the power switch of the first DC-DC power converter and a second control signal to the power switch of the second DC-DC power converter, vary a duty cycle of the first control signal to regulate the output voltage of the power supply, maintain a frequency of the second control signal at a fixed frequency, and in response to the duty cycle of the first control signal reaching a defined duty cycle threshold or a voltage received by the first DC-DC power converter reaching a defined voltage threshold, vary the frequency of the second control signal to regulate the output voltage.

16. The control circuit of claim 15 wherein the control circuit is configured to vary the duty cycle of the first control signal between the defined duty cycle threshold and a duty cycle lower than the defined duty cycle threshold.

17. The control circuit of claim 15 wherein the control circuit is configured to vary the frequency of the second control signal from a first defined frequency to a second defined frequency lower than the first defined frequency.

18. The control circuit of claim 15 wherein the control circuit is configured to maintain the duty cycle at the defined duty cycle threshold when the frequency of the second control signal is varied.

19. The control circuit of claim 15 wherein the control circuit is configured to vary the frequency of the second control signal in response to the duty cycle of the first control signal reaching the defined duty cycle threshold.

20. The control circuit of claim 15 wherein the control circuit is configured to vary the frequency of the second control signal in response to the voltage received by the first DC-DC power converter reaching the defined voltage threshold.

21. The multi-stage switching power supply of claim 1 wherein the first DC-DC power converter includes a buck power converter.

22. The multi-stage switching power supply of claim 21 wherein the second DC-DC power converter includes an LLC resonant power converter.

23. The multi-stage switching power supply of claim 3 wherein the AC-DC power converter includes a boost PFC power converter.

\* \* \* \* \*